(12) United States Patent
Cho

(10) Patent No.: US 11,439,230 B2
(45) Date of Patent: Sep. 13, 2022

(54) DISPLAY APPARATUS AND METHOD OF CONTROLLING THE SAME

(71) Applicant: Samsung Electronics Co., Ltd., Suwon-si (KR)

(72) Inventor: Eunjoo Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 16/585,410

(22) Filed: Sep. 27, 2019

(65) Prior Publication Data
US 2020/0367646 A1    Nov. 26, 2020

(30) Foreign Application Priority Data
May 24, 2019   (KR) .................. 10-2019-0061002

(51) Int. Cl.
| H04N 5/44 | (2011.01) |
| A47B 81/06 | (2006.01) |
| H04N 5/64 | (2006.01) |
| H04N 5/445 | (2011.01) |
| G05D 3/12 | (2006.01) |
| H04N 21/478 | (2011.01) |

(52) U.S. Cl.
CPC ............. *A47B 81/065* (2013.01); *G05D 3/12* (2013.01); *H04N 5/445* (2013.01); *H04N 5/64* (2013.01); *H04N 21/478* (2013.01)

(58) Field of Classification Search
CPC .......... H04N 5/445; H04N 5/655; H04N 5/44; H04N 5/232; H04N 5/64; H04N 21/478; A47B 81/065; G05D 3/12
USPC ................................. 348/836, 734; 700/302
See application file for complete search history.

(56) References Cited

U.S. PATENT DOCUMENTS

| 7,499,267 B2 * | 3/2009 | Kumano ............... G06F 1/1601 248/921 |
| 9,607,532 B2 * | 3/2017 | Gibson ..................... G09F 7/22 |
| 9,681,085 B2 * | 6/2017 | Jung ..................... F16M 13/02 |
| 10,371,312 B2 * | 8/2019 | Majumdar .......... F16M 11/2085 |
| 10,890,288 B2 * | 1/2021 | Gurr ................... H05K 5/0234 |

(Continued)

FOREIGN PATENT DOCUMENTS

| CN | 109027627 | 12/2018 |
| EP | 3 730 831 | 10/2020 |

(Continued)

OTHER PUBLICATIONS

International Search Report and Written Opinion of the International Searching Authority dated Feb. 21, 2020 in International Patent Application No. PCT/KR2019/012729.

(Continued)

*Primary Examiner* — Trang U Tran
(74) *Attorney, Agent, or Firm* — Staas & Halsey LLP

(57) ABSTRACT

Disclosed is a pivotable display apparatus and method thereof. The display apparatus includes a support body; a display body pivotable on the support body and displaying an image; a pivoting driver; and a processor configured to: control the pivoting driver to pivot the display body; identify whether the display body is obstructed from pivoting; and control the display body to display thereon a user interface (UI), which provides a guide in association with the pivoting of the displaying body, based on whether the display body is obstructed inform the pivoting.

19 Claims, 11 Drawing Sheets

(56) References Cited

U.S. PATENT DOCUMENTS

| | | | | |
|---|---|---|---|---|
| 2006/0290687 A1* | 12/2006 | Takaji | ............... | G06F 1/1601 |
| | | | | 345/204 |
| 2015/0182400 A1 | 7/2015 | Meyer et al. | | |
| 2018/0080598 A1* | 3/2018 | Ligtenberg | ........... | F16M 11/041 |
| 2020/0344439 A1* | 10/2020 | Choi | ................. | G06F 3/0488 |

FOREIGN PATENT DOCUMENTS

| | | | | |
|---|---|---|---|---|
| EP | 3 874 740 | 9/2021 | | |
| JP | 2004-205439 | 7/2004 | | |
| JP | 2005-336934 | 12/2005 | | |
| KR | 10-2009-0129536 | 12/2009 | | |
| KR | 10-2011-0038559 | 4/2011 | | |
| KR | 2011-0038559 A * | 4/2011 | ............ | H04N 5/655 |
| KR | 10-2014-0146488 | 12/2014 | | |
| KR | 2014-0146488 A * | 12/2014 | ........... | H04N 5/445 |
| KR | 10-2018-0038182 | 4/2018 | | |

OTHER PUBLICATIONS

Chinese Office Action dated Sep. 27, 2021, for Chinese Application No. 201910939973.4 (19 pages including translation).
Extended European Search Report dated Apr. 22, 2022 from European Application No. 19931064.0.

* cited by examiner

DISPLAY APPARATUS AND METHOD OF CONTROLLING THE SAME

CROSS-REFERENCE TO RELATED APPLICATIONS

This application is based on and claims priority under 35 U.S.C. § 119 to Korean Patent Application No. 10-2019-0061002 filed on May 24, 2019 in the Korean Intellectual Property Office, the disclosure of which is incorporated by reference herein in its entirety.

BACKGROUND

Field

The disclosure relates to a display apparatus and a method of controlling the same, and more particularly to a pivotable display apparatus and a method of controlling the same.

Description of the Related Art

A display apparatus such as a monitor, a television, etc. needs to be adjusted in angle of a screen so that a user can optimally view an image according to what image content is displayed. For example, when image content created in a portrait orientation is displayed on a display apparatus disposed in a landscape orientation, or when image content created in a landscape orientation is displayed on a display apparatus disposed in a portrait orientation, the display apparatus needs to be pivoted in order to properly display the content as a full screen. In particular, when a screen of a smartphone or tablet computer is mirrored to the display apparatus, the display apparatus needs to be disposed in the landscape or portrait orientation corresponding to the screen mode of the smartphone or tablet computer. By such demand, the display apparatus has been developed to include an angle control device, for example, a swivel or pivot device by which the angle of the screen is remotely controllable.

However, such a conventional remotely pivoting-controllable display apparatus is likely to collide with an obstacle while pivoting. In this case, a user may be disconcerted because a cause of obstructing the pivoting is unknown, or may forcedly control the pivoting and therefore damage the angle control device or the display apparatus itself.

SUMMARY

An aspect of one or more exemplary embodiments is to provide a display apparatus and a method of controlling the same, in which a user is informed of where pivoting of the display apparatus is obstructed, what causes the obstruction of the pivoting, which direction the pivoting is safe in, etc. when the display apparatus is obstructed from pivoting during the pivoting.

According to an exemplary embodiment, there is provided a display apparatus including: a support body; a display body pivotable on the support body and displaying an image; a pivoting driver; and a processor configured to: control the pivoting driver to pivot the display body; identify whether the display body is obstructed from pivoting; and control the display body to display a user interface (UI), which provides a guide in association with the pivoting of the display body, based on whether the display body is obstructed from the pivoting.

The processor may be configured to control the pivoting driver to stop pivoting the display body when the obstruction is identified.

The UI comprises a message that the display body is obstructed from the pivoting.

The processor may be configured to identify a usable display area based on a pivot angle of the display body, and displays the message on the identified usable display area.

The processor may be configured to control the message to be displayed horizontally or vertically based on the pivot angle of the display body.

The UI may be configured to inform a user of a force applying point to normally pivot the display body.

The display apparatus may further comprise a first sensor configured to detect a position at which the display body is prevented from pivoting.

The processor may be configured to operate in one of a manual mode in which a user is guided by the guide UI to manually make the display body normally pivot, and an automatic mode in which the pivoting driver is controlled to make the display body normally pivot, and identify the manual mode or the automatic mode based on data detected by the sensor.

The guide UI may be configured to show a position at which the display body is obstructed from pivoting.

The guide UI may be configured to guide a pivoting direction for normally pivoting the display body.

The processor may be configured to identify the pivoting direction based on a pivoted angle of the display body.

The guide UI may be configured to show a direction in which a user makes pivoting.

The processor may be configured to control the pivoting driver to slow down a pivoting speed of the display body based on the identified obstruction in pivoting the display body.

The display apparatus may further comprise a second sensor configured to detect presence of an obstacle on a pivoting path of the display body, and the processor may be configured to control the display body not to be obstructed by the obstacle based on detection of the second sensor.

According to an exemplary embodiment, there is provided a method of controlling a display apparatus, including: receiving a command issued to pivot a display body; pivoting the display body based on the command; stopping pivoting the display body based on a collision detected while pivoting the display body; and displaying a user interface (UI), which provides a guide in association with the pivoting of the display body, on the display body.

BRIEF DESCRIPTION OF THE DRAWINGS

The above and/or the aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
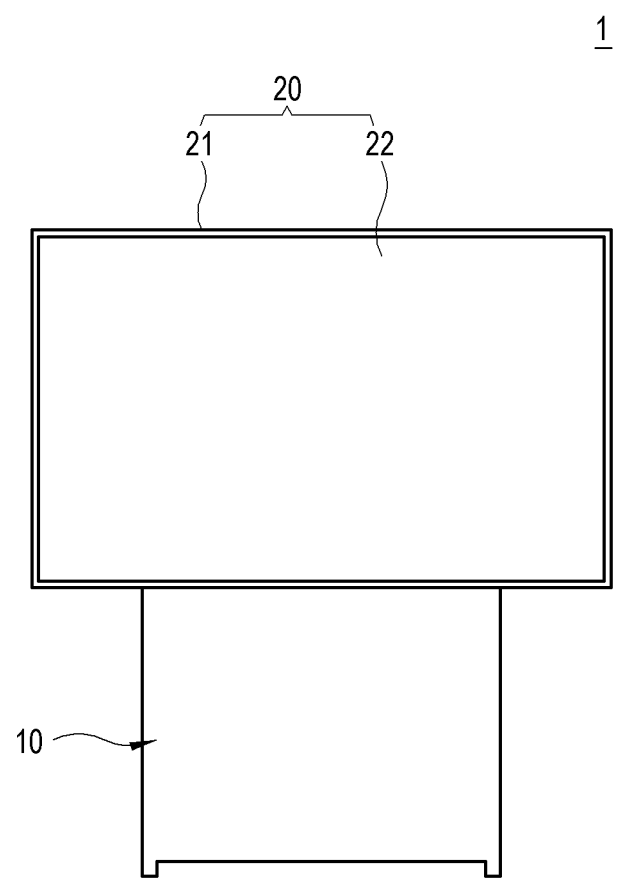
FIG. 1 is a view illustrating that a display of a display apparatus according to an embodiment of the disclosure is disposed in a landscape orientation.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is identified that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operations, elements, components or combination thereof. In addition, in the following exemplary embodiments, terms 'upper', 'lower', 'left', 'right', 'inside', 'outside', 'inner', 'outer', 'front', 'rear', etc. are defined with respect to the accompanying drawings, and do not restrict the shape or position of the elements. Further, in the following exemplary embodiments, at least one among a plurality of elements refer to not only all of the plurality of elements but also each element among the plurality of elements excluding the other elements or a combination thereof.

FIG. 1 illustrates a display apparatus 1 according to an embodiment of the disclosure. As shown therein, the display apparatus 1 may include a support body 10, and a display body 20 having a display 22 surrounded with a bezel 21. The display apparatus 1 may for example be actualized by a television (TV), a monitor, a signage, an electronic frame, etc.

The support body 10 may pivotally support the display body 20.

In FIG. 1, the display body 20 is disposed in a landscape orientation with respect to the support body 10. In this case, the display body 20 may display a full screen based on an image created in a landscape orientation or a landscape-oriented screen of a smartphone. The display body may be pivoted clockwise or counterclockwise by a predetermined angle, for example, 90 degrees in response to a user's request or in accordance with a content type, and disposed in a portrait orientation.

Figure 2:
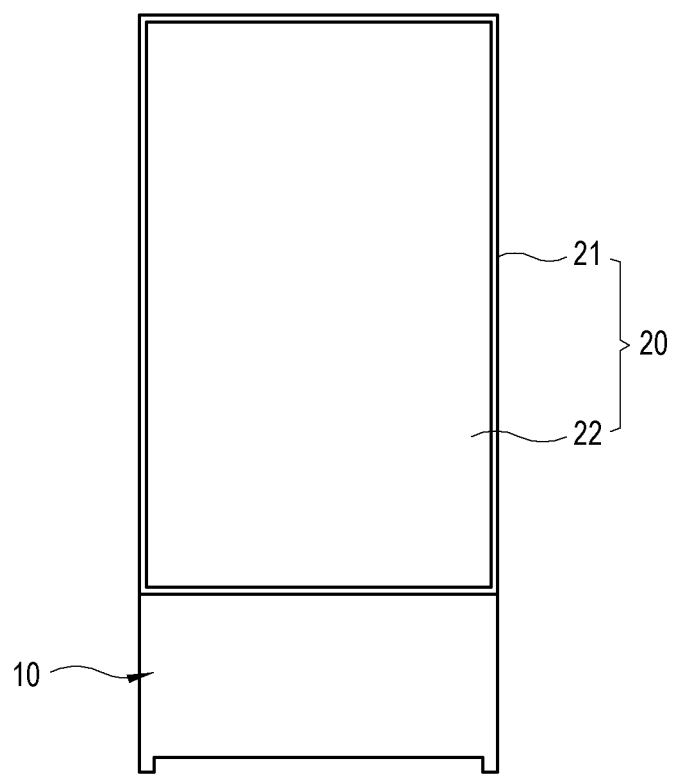
FIG. 2 is a view illustrating that the display of the display apparatus in FIG. 1 is pivoted and disposed in a portrait orientation.

FIG. 2 shows that the display body 20 is pivoted clockwise or counterclockwise by 90 degrees from the display apparatus of FIG. 1, i.e. shows that the display body 20 is disposed in the portrait orientation with respect to the support body 10. In this case, the display body 20 may display a full screen based on an image created in the portrait orientation or a portrait-oriented screen of the smartphone.

Figure 3:
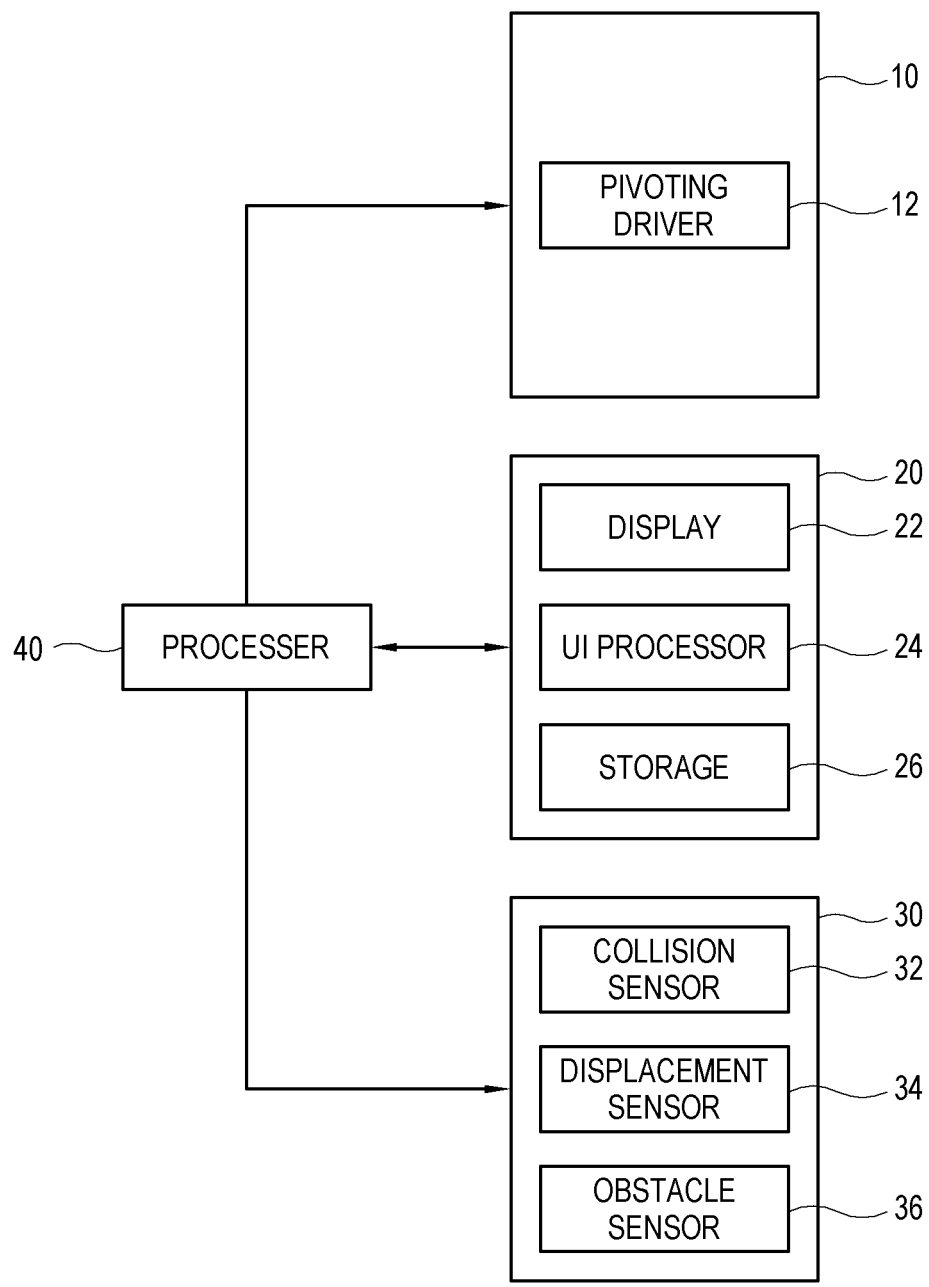
FIG. 3 is a block diagram of the display apparatus in FIG. 1.

FIG. 3 is a block diagram of the display apparatus 1 in FIG. 1. As shown therein, the display apparatus 1 may include the support body 10, the display body 20, a sensor 30, and a processor 40.

The support body 10 may for example include a pivoting driver 12 shaped like a box and pivoting the display body 20. As necessary, the support body 10 may accommodate parts of the display body 20, for example, an image processor, an audio processor, a loudspeaker, etc. The support body 10 may further include a power supply for supplying power to the pivoting driver 12 and the display body 20.

The pivoting driver 12 may be actualized by a motor having a rotary shaft and rotatable forward by or backward. The display body 20 is mounted to the rotary shaft of the motor and pivoted as the rotary shaft rotates.

The display body 20 may include the display 22, a user interface (UI) processor 24, and a storage 26. The display body 20 may further include the video processor, the audio processor, a wired/wireless communicator, the loudspeaker, etc.

The display 22 may display an image, a text, graphics, etc. under control of the processor 40. The display 22 may display a guide UI when the display body 20 is obstructed from pivoting during the pivoting.

The display 22 may for example be actualized by various display panels, such as liquid crystal, plasma, a light emitting diode (LED), an organic light emitting diode (OLED), a surface-conduction electron-emitter, a carbon nano-tube, nano-crystal, etc. The display 22 may additionally include an appended element according to actualization methods. For example, when the display 22 is actualized by the liquid crystal, there may be additionally provided a backlight unit for emitting light, and a panel driving substrate for driving the display panel.

The display 22 may be actualized by a touch screen forming a layered structure together with a touch pad. In this case, the display 22 may be used for a user interface as well as an output device. Further, the touch screen may be configured to detect pressure of a touch input as well as position and area of the touch input.

The UI processor 24 may function to process/generate various UI screens in the form of two dimensions or three dimensions. Here, the UI screen may include the guide UI generated based on the foregoing obstruction in the pivoting of the display body 20. The guide UI may include a text or graphic message, or the like.

The UI processor 24 may control transparency, color, size, shape, position control, highlight, animation effect, or the like job of an UI element under control of the processor 40.

The storage 26 refers to a storage medium configured to store video data, graphic data, various programs for operating the display body 20, etc. therein, and may be actualized by a memory, a hard disk drive (HDD), etc. For example, the storage 26 may include a read only memory (ROM) configured to store a program for carrying out operation of the processor 40, a random access memory (RAM) configured to temporarily store data caused by the operation of the processor 40, etc. Further, the storage 26 may further include an electrically erasable and programmable ROM (EEROM) configured to store various pieces of reference data.

The storage 26 may be configured to store preset guide UI information, various application, etc. Here, the preset UI information may include a warning or guide message, a collision position, a force applying point, a force applying direction, or the like information given by the processor 40 when the display body 20 is obstructed from pivoting.

The sensor 30 may include a collision sensor 32, a displacement sensor 34, and an obstacle sensor 36.

The collision sensor 32 may be actualized by a pressure sensor, for example, a touch sensor to detect a collision with an obstacle while the display body 20 is pivoting. The collision sensor 32 may be provided on an outer circumference of the bezel (see '21' in FIG. 1) of the display body 20 and detect a collision with an obstacle or a person during the pivoting.

The displacement sensor 34 may be actualized by a gyro sensor to detect an azimuthal change of an object based on tendency to always keep a certain initially-set direction. The displacement sensor 34 may be provided inside the display body 20 and detect a pivoting angle of the display body 20.

The obstacle sensor 36 may be actualized by a radar sensor, an ultrasonic sensor, an infrared sensor, or the like to detect whether an obstacle or a person is present on a pivoting path of the display body 20 during the pivoting of the display body 20. The obstacle sensor 36 is provided at a corner portion of the bezel (see '21' of FIG. 1) of the display body 20 and detects whether an obstacle or a person is present in a pivoting direction.

The processor 40 may perform control to operate the elements of the display apparatus 1. The processor 40 may be actualized by two processors for respectively controlling the pivoting driver 12 of the support body 10 and the display body 20. In this case, two processors may share information with each other.

The processor 40 may control the pivoting driver 12 to pivot the display body 20 when a user command issued to pivot the display body 20 in an orientation suitable for content desired to be displayed is input through a UI of a remote controller, a touch pad, an input key, a mouse, etc.

The processor 40 may identify whether content displayed in response to an event of mirroring a screen of a smartphone to the display 22 of the display body 20 is landscape content or portrait content, and thus identify whether to pivot the display body 20. The processor 40 may control the pivoting driver 12 to pivot the display body 20 when there is a need of pivoting the display body 20.

The processor 40 may control the display body 20 to display the guide UI on the display 22 when the display apparatus is obstructed from pivoting by various causes, for example, collision with an object or a person, failure in the pivot driver 12, a foreign material trapped in between the support body 10 and the display body 20, etc. during the pivoting of the display body 20. The guide UI may include an alarming or warning text message about the obstruction of the pivoting, an obstacle collision position mark, a safe recovering direction indicator, a minimum force applying point, presence of an obstacle on a pivoting path, etc.

The processor 40 may display the guide UI while stopping pivoting the display body 20 or slowing a pivoting speed down, based on information received from the sensor 30.

The processor 40 may identify a usable display area based on a pivoted angle of the display body 20, and display a proper text message on the identified usable display area. When the text message is displayed on the usable display area, the processor 40 may display the text message in the landscape or portrait orientation based on the pivoted angle of the display body 20 so that a user can easily read the text message.

The processor 40 may include a control program (or instruction) for carrying out control operation, and at least one central processing unit (CPU) for executing the loaded control program.

The control program may include a program(s) actualized in the form of at least one of a basic input/output system (BIOS), a device driver, an operating system, firmware, a platform, and an application program (App). According to an embodiment, the application program may be previously installed or stored when the display apparatus 1 is manufactured, or may be installed later based on App data received from the outside when needed. The App data may for example be downloaded from an App server such as an application market to the display apparatus 1. Such an App server is an example of a computer program product according to the disclosure, but not limited thereto.

The display apparatus 1 according to an embodiment of the disclosure may enter a manual mode or an automatic mode as necessary to solve a problem of pivoting obstruction when the display 22 is obstructed from pivoting during the pivoting.

Figure 4:
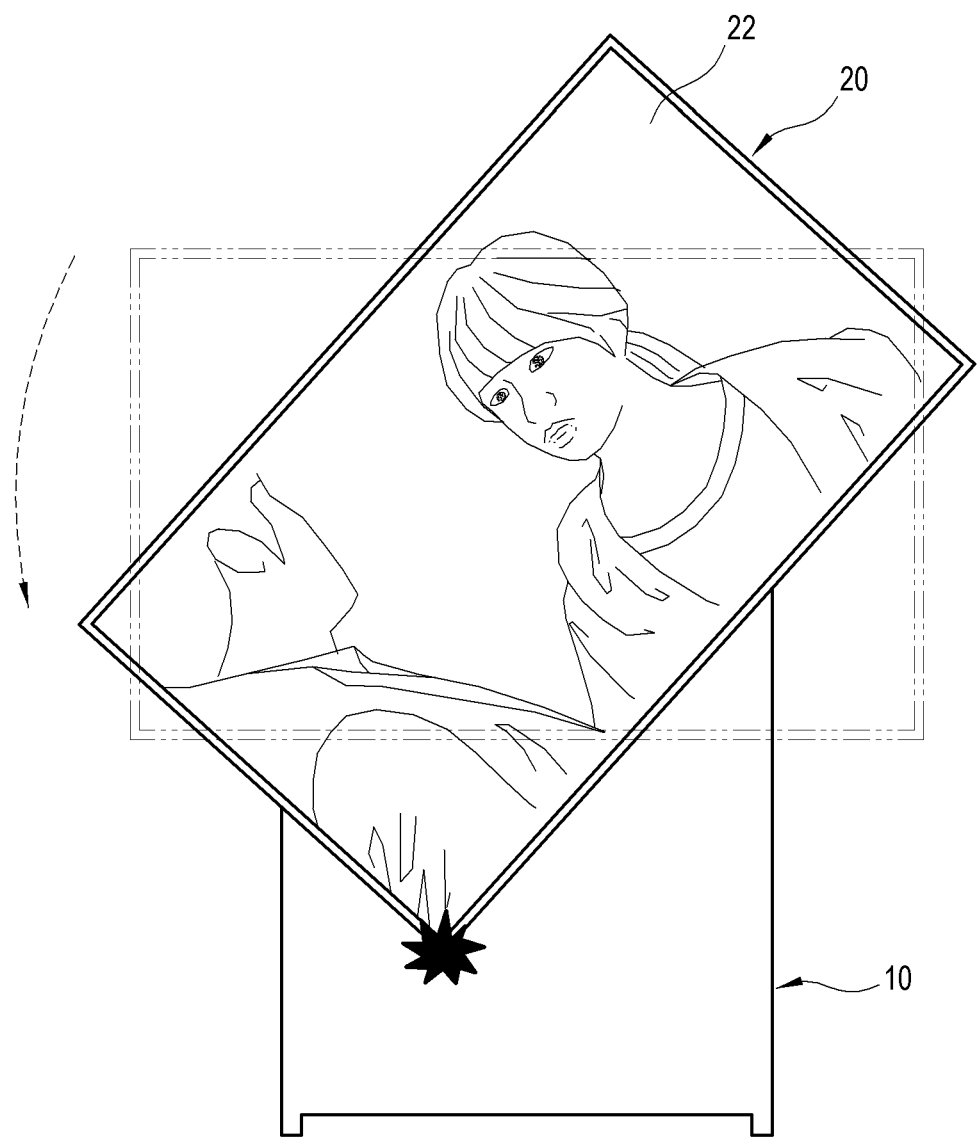
FIG. 4 is a view illustrating that collision occurs while the display apparatus in FIG. 1 is pivoted counterclockwise to have a portrait orientation.
Figure 5:
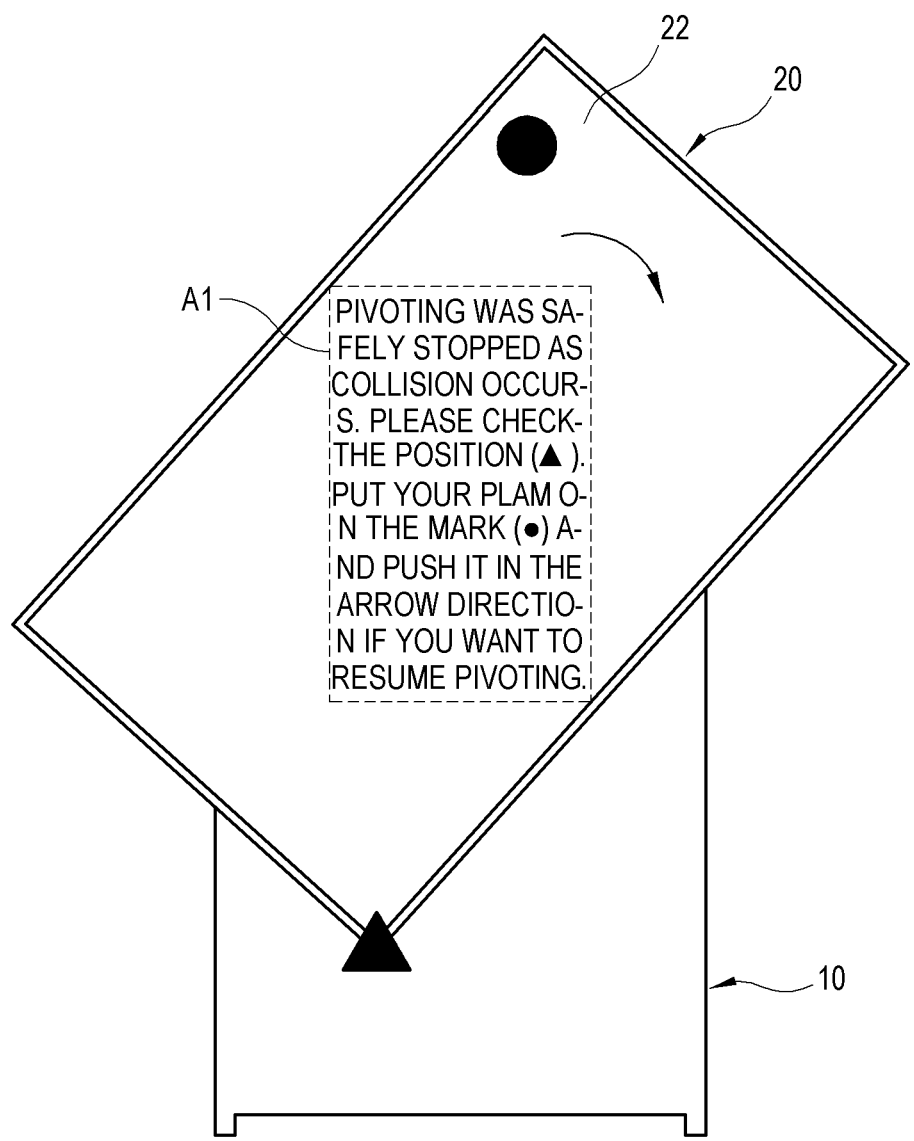
FIG. 5 is a view illustrating a first guide user interface (UI) displayed based on a pivoted angle of the display in FIG. 4.
Figure 6:
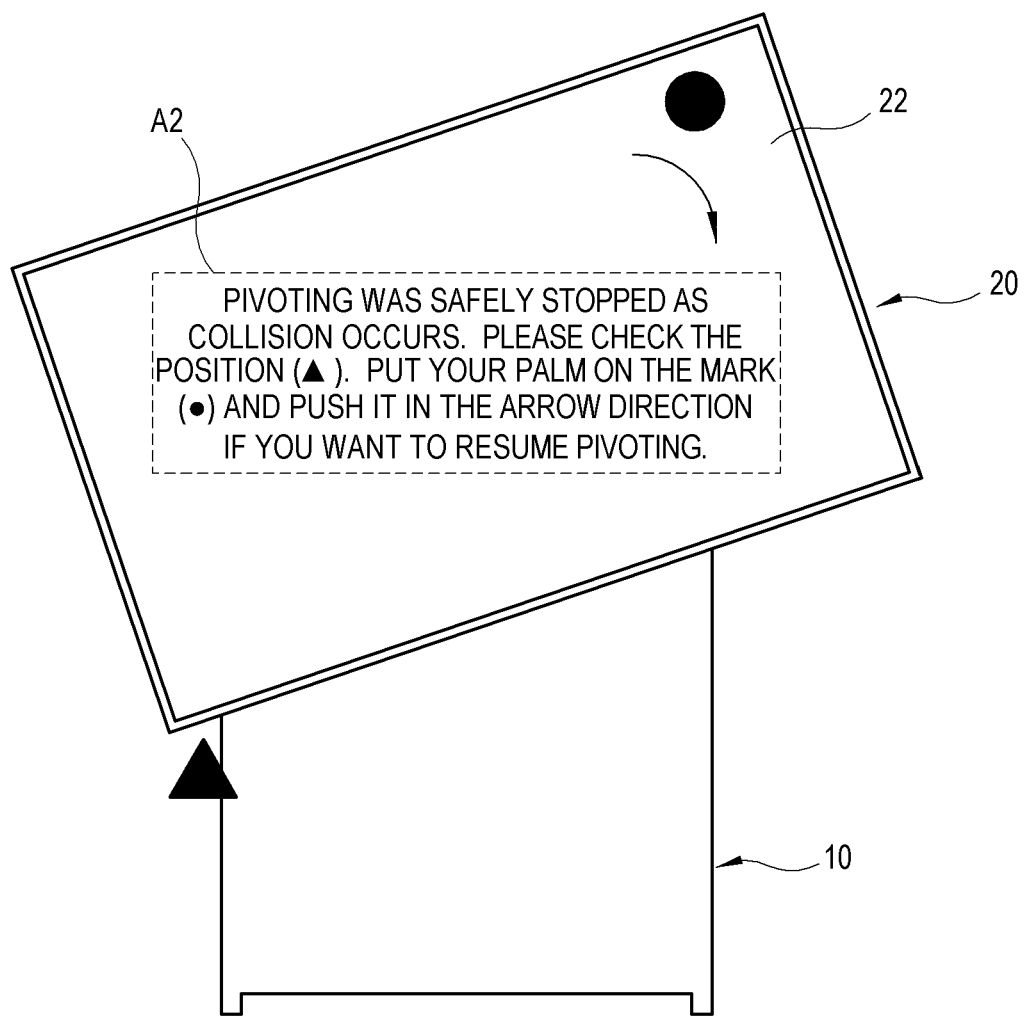
FIG. 6 is a view illustrating a second guide UI displayed based on a pivoted angle of the display in FIG. 4.

FIG. 4 depicts that a collision occurs while the display body 20 of FIG. 1 disposed in the landscape orientation pivots counterclockwise to have the portrait orientation of and FIGS. 5 and 6 depict first and second UIs displayed on the display 22 according to the pivoted angle of the display body 20 in the manual mode.

Referring to FIGS. 5 and 6, the processor 40 may identify the pivoted angle and collision position of the display body 20 through the collision sensor 32, and then control the display 22 to display a first guide UI A1 or second guide UI A2 in which a collision position, a safe normal pivoting direction and a force applying point are respectively marked with "▲", "→," and "●". For example, the first guide UI A1 or the second guide UI A2 may contain a guide message of "Pivoting was safely stopped as collision occurs. Please check the position (▲). Put your palm on the mark (●) and push it in the arrow direction (→) if you want to resume pivoting." Here, the arrow direction in the guide message may be displayed on the display 22 as an opposite direction to the pivoting direction of the display body 20.

The processor 40 may control an angle of the guide message displayed on the screen based on the pivoted angle of the display body 20, so that the first guide UI A1 or the second guide UI A2 can be displayed with the guide message oriented horizontally or vertically with respect to a user.

As shown in FIG. 5, the processor 40 may display the guide message within a vertically long rectangular usable display area A1 when the display body 20 is pivoted at an angle greater than or equal to 45 degrees from a reference position (e.g. a horizontal position). On the other hand, referring to FIG. 6, the processor 40 may display the guide message within a horizontally long rectangular usable display area A2 when the display body 20 is pivoted at an angle smaller than 45 degrees from the reference position (e.g. the horizontal position).

The processor 40 may display a pop-up message about a direction of force applied by a user and a wrong pivoting direction based on the first and second guide UIs shown in FIGS. 5 and 6.

The processor 40 may operate based on a user command remotely issued through the interface of the first guide UI A1 or second guide UI A2 instead of making a user directly pivot the display body 20 in a safe direction when the display body 20 collides with an obstacle.

Figure 7:
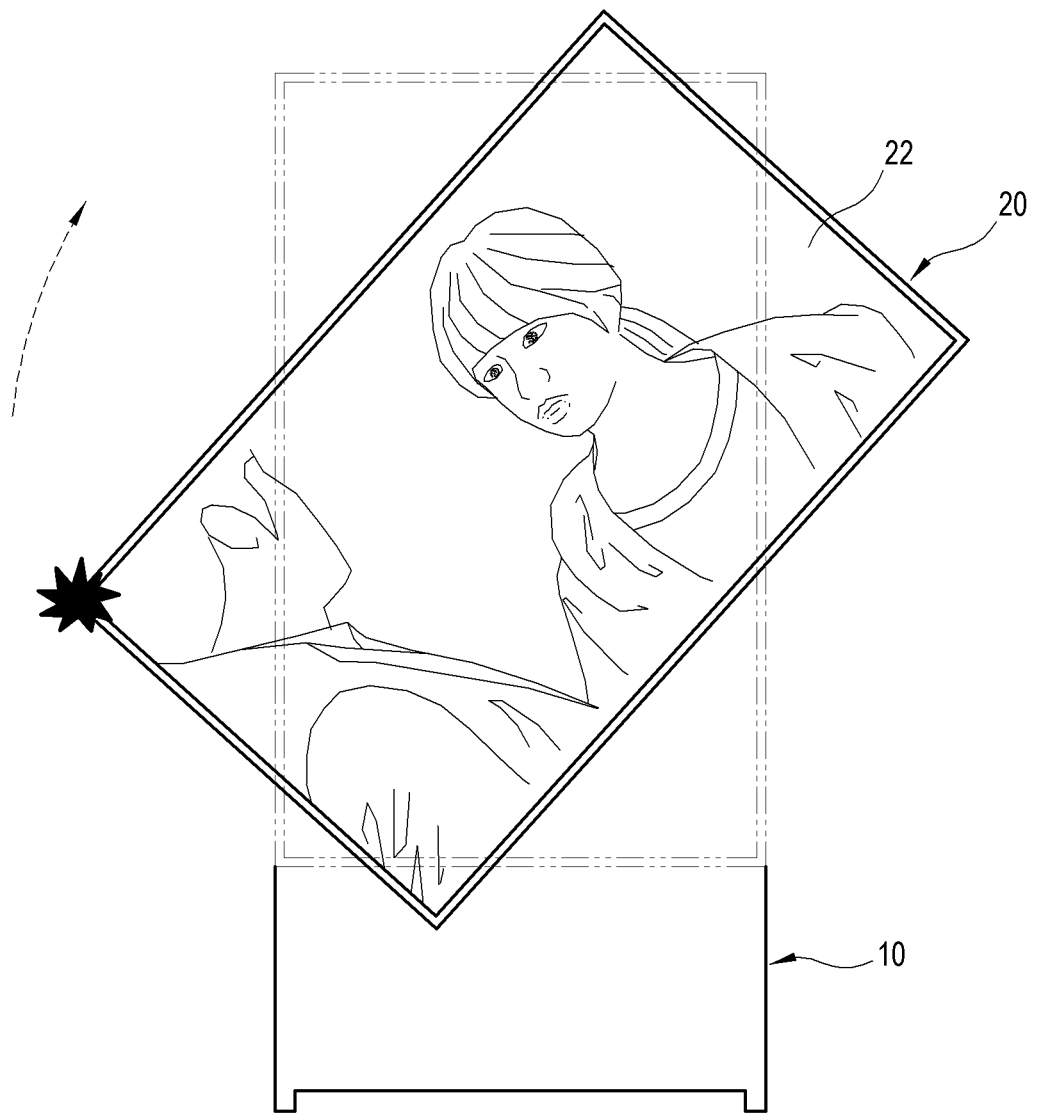
FIG. 7 is a view illustrating that collision occurs while the display apparatus in FIG. 2 is pivoted clockwise to have a landscape orientation.
Figure 8:
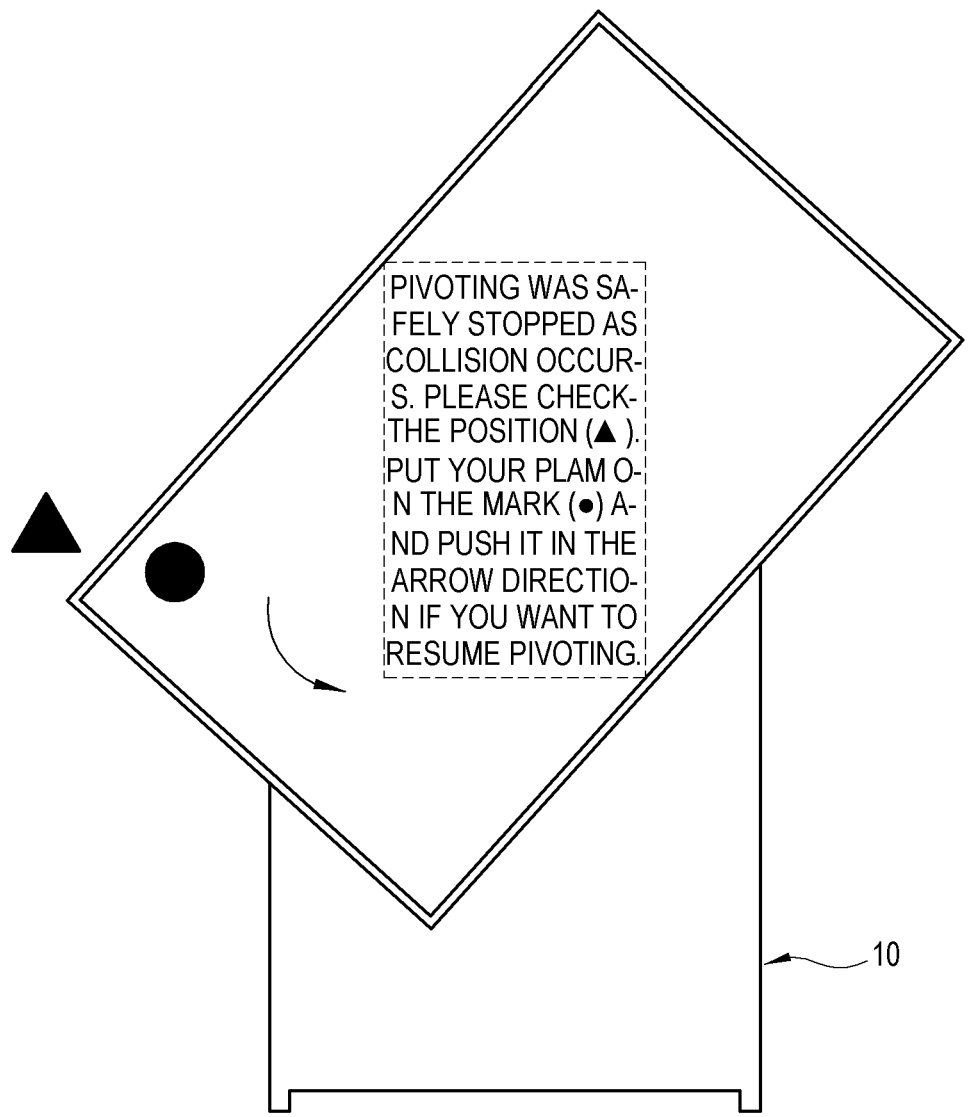
FIG. 8 is a view illustrating the first guide UI displayed based on a pivoted angle of the display in FIG. 7.
Figure 9:
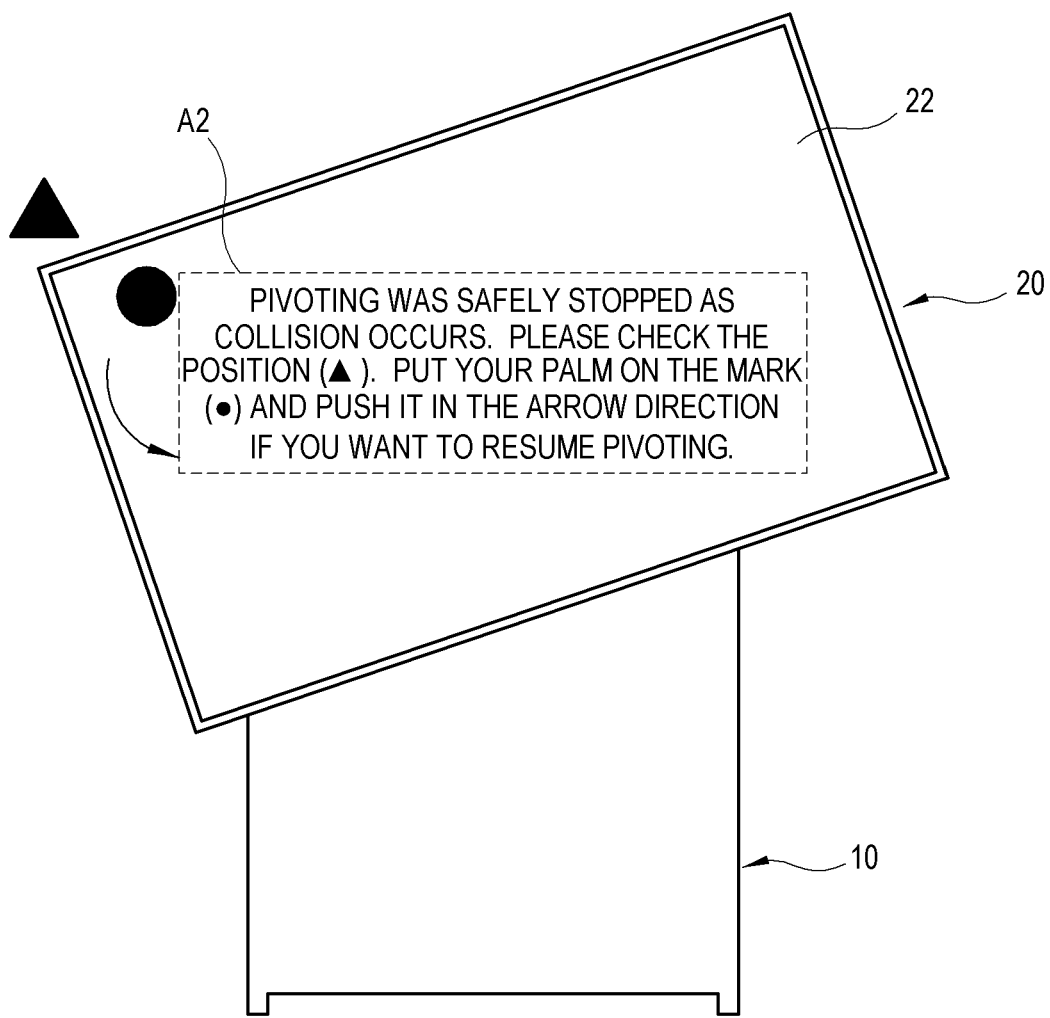
FIG. 9 is a view illustrating the second guide UI displayed based on a pivoted angle of the display in FIG. 7.

FIG. 7 depicts that a collision occurs while the display body 20 of FIG. 2 disposed in the portrait orientation pivots clockwise to have the landscape orientation of FIG. 1, and FIGS. 8 and 9 depict first and second UIs displayed on the display 22 according to the pivoted angle of the display body 20 in the manual mode.

Referring to FIGS. 8 and 9, the processor 40 may identify the pivoted angle and collision position of the display body 20 through the collision sensor 32, and then control the display 22 to display the first guide UI A1 or second guide UI A2 in which the collision position, the safe normal pivoting direction and the force applying point are respectively marked with "▲", "←," and "●". For example, the first guide UI A1 or the second guide UI A2 may contain a guide message of "Pivoting was safely stopped as collision occurs. Please check the position (▲). Put your palm on the mark (●) and push it in the arrow direction (←) if you want to resume pivoting." Here, the arrow direction in the guide message may be displayed on the display 22 as an opposite direction to the pivoting direction of the display body 20.

The processor 40 may control an angle of the guide message displayed on the screen based on the pivoted angle of the display body 20, so that the first guide UI A1 or the second guide UI A2 can be displayed with the guide message oriented horizontally or vertically with respect to a user.

As shown in FIG. 8, the processor 40 may display the guide message within a vertically long rectangular usable display area A1 when the display body 20 is pivoted at an angle greater than or equal to 45 degrees from a reference position (e.g. a horizontal position). On the other hand, referring to FIG. 9, the processor 40 may display the guide message within a horizontally long rectangular usable display area A2 when the display body 20 is pivoted at an angle smaller than 45 degrees from the reference position.

Figure 10:
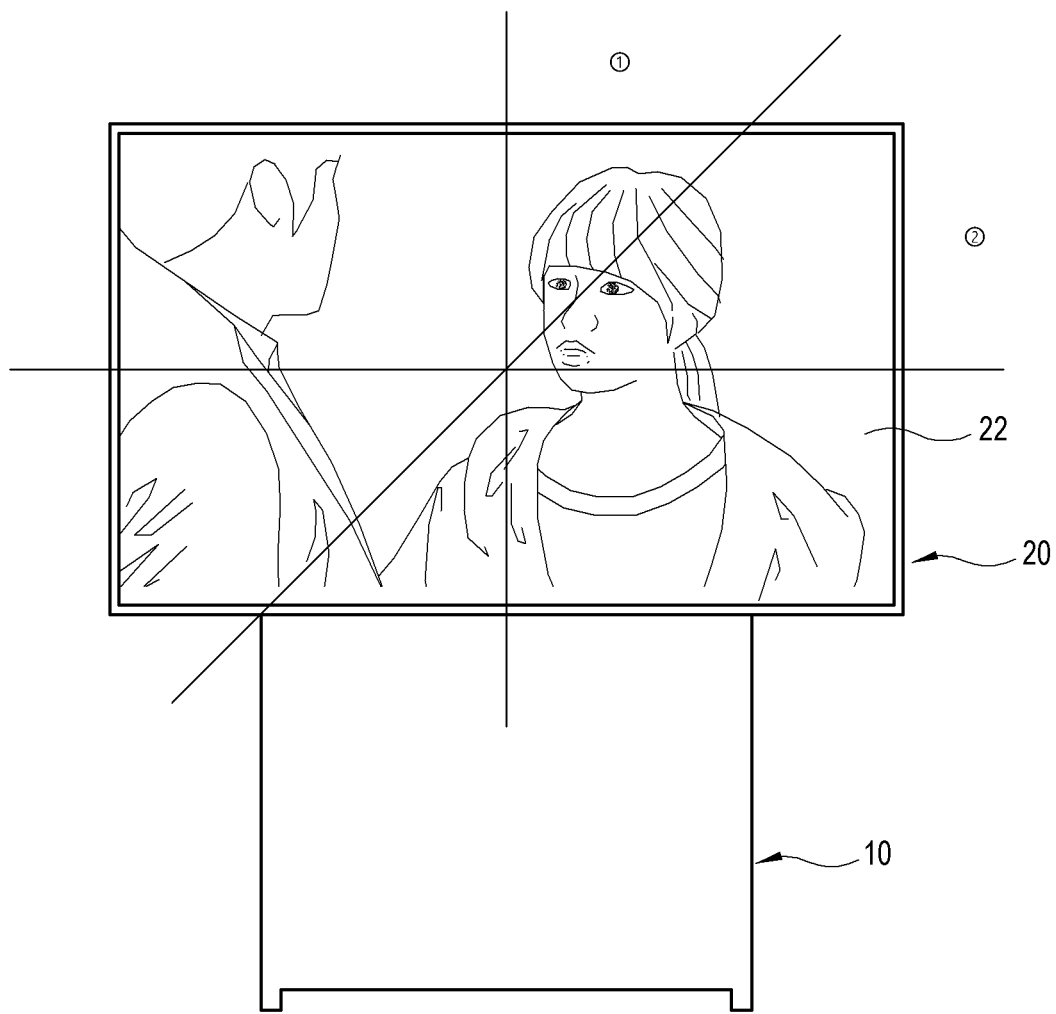
FIG. 10 is a view for explaining control of a display apparatus in an automatic mode at collision during pivoting of a display.

FIG. 10 is a view for explaining operation based on a collision position of the display body 20 in the automatic mode. In the automatic mode, the processor 40 slows a normal pivoting speed down to reduce overload of the pivoting driver 12 or prevent the display body 20 from damage when a collision occurs. The automatic mode may be carried out in between a case where an obstacle is removable and a case where an obstacle is not removable.

First, the case where an obstacle is removed will be described. Referring to FIG. 10, when a collision occurs while the display body 20 is pivoting within a pivoting range $\hat{1}$ of 0~45 degrees, the processor 40 may return the display body 20 counterclockwise. That is, the display body 20 is disposed in the landscape or horizontal orientation. On the other hand, when a collision occurs while the display body 20 is pivoting within a pivoting range $\hat{2}$ of 45-90 degrees, the processor 40 may return the display body 20 clockwise. That is, the display body 20 is disposed in the portrait orientation. When a collision occurs while the display body 20 is pivoting in a middle region of about 45 degrees, the processor 40 may pivot the display body 20 based on a user's request. Like this, in the automatic mode, the processor 40 may return the display body 20 in a direction to have the least movement from the pivoting angles of 0, 45 and 90 degrees. Likewise, the processor 40 may also rotate the guide UI as much as the pivoted angle of the display body 20 so that a user can easily view the guide UI.

Further, the processor 40 returns the display body 20 in an opposite direction to an instruction direction for a target orientation when a collision occurs, thereby not only solving a problem of a trapped foreign material but also avoiding a collision position as the display body 20 is pivoted in the direction opposite to the instruction direction. Of course, when the display body 20 does not reach the target position according to the states of the obstacle even though it is pivoted in the opposite direction to the instruction direction, the processor 40 may identify that the pivoting toward the target position is impossible and return the display body 20 to an initial position.

Figure 11:
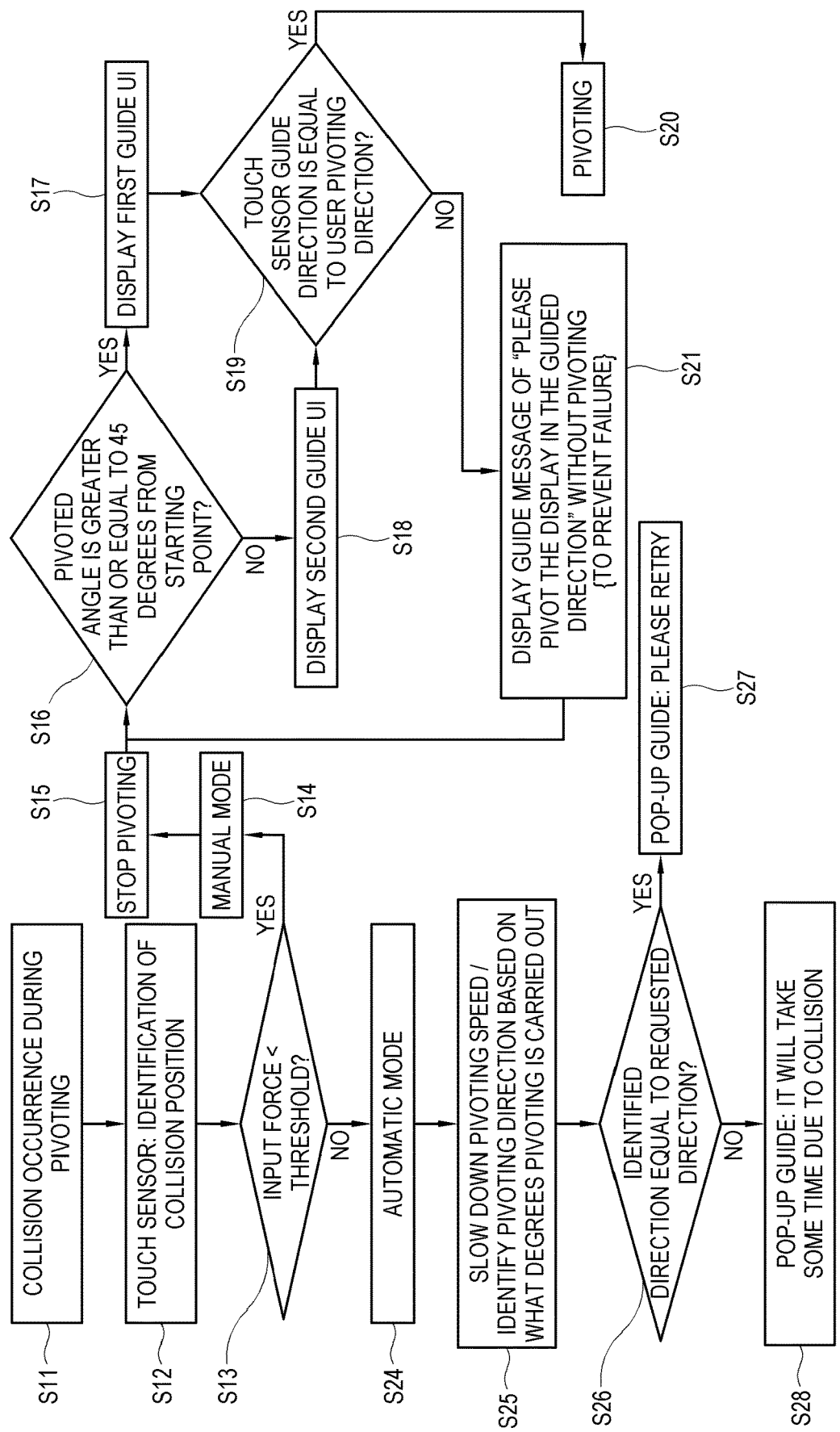
FIG. 11 is a flowchart showing a method of controlling a display apparatus according to an embodiment of the disclosure.

FIG. 11 is a flowchart showing a method of controlling the display apparatus 1 under a condition that the pivoting display body 20 collides with an obstacle or a person. The collision during the pivoting is merely an example, and the conditions may include previous detection of an obstacle, failure in the pivoting driver 12, a foreign material trapped in between the support body 10 and the display body 20, etc.

Referring, to FIG. 11, at operation S11, it is identified that the display 22 pivoting based on a user's command or event occurrence collides with an obstacle present on pivoting path.

At operation S12, the processor 40 may identify a collision position based on information transmitted from the sensor 30, for example, the touch sensor.

At operation S13, the processor 40 identifies whether collision force input from the sensor 30 is lower than a threshold. Here, the collision force refers to pressure detected by the touch sensor when the display body 20 collides with an obstacle during pivoting. When the collision force is less than the threshold, at operation S14 a manual mode is implemented. On the other hand, when the collision force is higher than or equal to the threshold, at operation S24 an automatic mode is implemented.

Alternatively, it may be identified whether to implement the manual mode or the automatic mode, based on not only the strength of the collision force but also collision detection of the collision sensor 32 and the previous obstacle detection of the obstacle sensor 36. That is, the processor 40 may enter the automatic mode based on the previous obstacle detection of the obstacle sensor 36, or enter the manual mode based on the collision detection of the collision sensor 32. When an obstacle is previously detected, a user may issue a command to stop pivoting the display body 20, remove an obstacle, and pivot the display body 20 toward a target position. When an obstacle is easily removable, for example, when the obstacle is a person, the processor 40 may outputs a voice warning message and slow down the pivoting speed of the display body 20. When an obstacle or a person instantaneously obstructs the pivoting path, a collision may occur even though the previous detection has previously been carried out by the obstacle sensor 36.

Below, the manual mode of the operation S14 will be described.

At operation S15, the processor 40 stops operating the pivoting driver 12 and thus stops pivoting the display body 20.

At operation S16, the processor 40 identifies whether the angle of the display body 20 pivoted from a starting point is greater than or equal to 45 degrees. When the pivoted angle of the display body 20 is greater than or equal to 45 degrees, the processor 40 performs operation S17. Otherwise, the processor 40 performs operation S18.

In the operation S17, the processor 40 may display the first guide UI as shown in FIGS. 5 and 8.

In the operation S18, the processor 40 may display the second guide UI as shown in FIGS. 6 and 9.

Thus, a user can manually return the display body 20 by a method guided in the operation S17 or S18.

At operation S19, the processor 40 identifies whether a direction which a user returns the display body 20 in is equal to the guided direction. When the returning direction is equal to the guided direction, the processor 40 performs operation S20. Otherwise, the processor 40 performs operation S21.

In the operation S20, the processor 40 pivots the display body 20 in the returning direction.

In the operation S21, the processor 40 provides a retrying guide without pivoting the display body 20 to prevent failure. Here, a guide message may be given by a voice or a text.

Below, the automatic mode of the operation S24 will be described.

At operation S25, the processor 40 controls the pivoting driver 12 to slow down the pivoting speed of the display body 20 and identifies an ongoing pivoting direction or a returning direction opposite thereto in accordance with what degrees the display body 20 is pivoted. The returning direction may for example be carried out by the foregoing method described with reference to FIG. 11.

At operation S26, the processor 40 identifies whether the returning direction is equal to the ongoing pivoting direction. When the returning direction is equal to the ongoing pivoting direction, the processor 40 performs operation S27. Otherwise, the processor 40 performs operation S28.

In the operation S27, the processor 40 displays a pop-up message for guiding the retrying.

In the operation S28, the processor 40 displays a pop-up message that it will take some time to solve the problem of the collision.

As described above, the display apparatus of the disclosure identifies a correct cause and provides a solution of a problem through a guide UI, which informs a user of a guide message, an obstructed position, a pivoting direction for normal pivoting, a force applying point, etc. even though pivoting is obstructed.

The display apparatus horizontally or vertically displays the guide message even in a pivoted state so that a user can easily read the guide message.

The display apparatus pivots in a safe normal pivoting direction to thereby prevent the pivoting driver or the display from damage.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
a support body;
a display body pivotable on the support body, the display body being configured to display an image;
a pivoting driver; and
a processor configured to:
control the pivoting driver to pivot the display body,
identify whether the display body is obstructed from pivoting, and
control the display body to display a user interface (UI), which provides a guide in association with the pivoting of the display body, based on whether the display body is obstructed from the pivoting,
wherein when a collision is detected during the pivoting the display body,
in a first operating mode, guide a user by the UI to manually pivot the display body by informing the user of a force applying point to pivot the display body, and
in a second operating mode, automatically control the pivoting driver of the display apparatus to pivot the display body.

2. The display apparatus according to claim 1, wherein the processor is configured to control the pivoting driver to stop pivoting the display body when the obstruction is identified.

3. The display apparatus according to claim 1, wherein the UI comprises a message that the display body is obstructed from the pivoting.

4. The display apparatus according to claim 3, wherein the processor is configured to identify a usable display area based on a pivot angle of the display body, and to display the message on the identified usable display area.

5. The display apparatus according to claim 3, wherein the processor is configured to control the message to be displayed horizontally or vertically based on a pivot angle of the display body.

6. The display apparatus according to claim 1, wherein the UI informs a user of a force applying point to pivot the display body.

7. The display apparatus according to claim 1, further comprising:
a sensor configured to detect a position at which the display body is obstructed from pivoting.

8. The display apparatus according to claim 7, wherein the processor is configured to operate in one of the first operating which is a manual mode in which a user is guided by the UI to manually pivot the display body, and the second operating which is an automatic mode in which the pivoting driver controls the display body to pivot,
wherein the manual mode or the automatic mode is identified based on data detected by the sensor.

9. The display apparatus according to claim 1, wherein the guide of the UI shows a position at which the display body is obstructed from the pivoting.

10. The display apparatus according to claim 5, wherein the guide of the UI shows a pivoting direction for pivoting the display body.

11. The display apparatus according to claim 10, wherein the processor is configured to identify the pivoting direction based on a pivot angle of the display body.

12. The display apparatus according to claim 1, wherein the UI shows a direction in which a user pivots the display body.

13. The display apparatus according to claim 1, wherein the processor is configured to control the pivoting driver to slow down a pivoting speed of the display body based on the obstruction identified in the pivoting of the display body.

14. The display apparatus according to claim 1, further comprising:
a sensor configured to detect presence of an obstacle on a pivoting path of the display body,
wherein the processor is configured to control the pivoting driver to control the display body not to be obstructed by the obstacle based on detection of the sensor.

15. A method of controlling a display apparatus, comprising:
pivoting a display body on a support body, the display body being configured to display an image;
identifying whether the display body is obstructed from pivoting; and
controlling the display body to display a user interface (UI), which provides a guide in association with the pivoting of the display body, based on whether the display body is obstructed from the pivoting,
wherein when a collision is detected during the pivoting of the display body,
   in a first operating mode, guiding a user by the UI to manually pivot the display body by informing the user of a force applying point to pivot the display body, and
   in a second operating mode, automatically controlling a pivoting driver of the display apparatus to pivot the display body.

16. The method according to claim 15, further comprising controlling the pivoting driver to stop pivoting the display body when a collision is detected.

17. The method according to claim 15, wherein the UI comprises a message that the display body is obstructed from the pivoting.

18. The method according to claim 17, further comprising identifying a usable display area based on a pivot angle of the display body, and displaying the message on the identified usable display area.

19. The method according to claim 18, wherein the message is displayed horizontally or vertically based on a pivot angle of the display body.

* * * * *